(12) United States Patent
Pilette et al.

(10) Patent No.: US 7,699,374 B2
(45) Date of Patent: Apr. 20, 2010

(54) CONNECTIVE SYSTEM

(75) Inventors: Thomas M. Pilette, Lake Orion, MI (US); Martin R. Matthews, Troy, MI (US)

(73) Assignee: Magna International Inc., Aurora (CA)

( * ) Notice: Subject to any disclaimer, the term of this patent is extended or adjusted under 35 U.S.C. 154(b) by 576 days.

(21) Appl. No.: 11/692,251

(22) Filed: Mar. 28, 2007

(65) Prior Publication Data
US 2008/0238145 A1  Oct. 2, 2008

(51) Int. Cl.
B62D 27/00 (2006.01)
B62D 21/12 (2006.01)
B21D 53/88 (2006.01)

(52) U.S. Cl. .................... 296/29; 296/204; 296/205; 296/193.09; 29/525.01; 29/897.2; 403/319; 280/785

(58) Field of Classification Search ............... 296/29, 296/203.01, 204, 205, 203.02, 203.03, 203.04, 296/193.09; 293/155; 280/785; 29/897.2, 29/453, 525.01; 403/275, 277, 319
See application file for complete search history.

(56) References Cited

U.S. PATENT DOCUMENTS 3,837,754 A *  9/1974  Malcik .................. 403/217
6,749,358 B2 *  6/2004  Balsells ................. 403/316
7,431,384 B2 * 10/2008  Kapadia et al. ....... 296/193.09

* cited by examiner

Primary Examiner—Joseph D Pape
(74) Attorney, Agent, or Firm—Warn Partners P.C.

(57) ABSTRACT

A connective system for connecting a first body to a second body having an aperture, is provided. The system includes a pin connected with the first body. The pin has a detent surface. A retainer ring having a snap fit engagement with the pin detent surface is provided. The retainer ring also has a locking arm for entry into the aperture of the second body with snap fit engagement with a surface of the second body thereby retaining the second body with said first body.

20 Claims, 3 Drawing Sheets

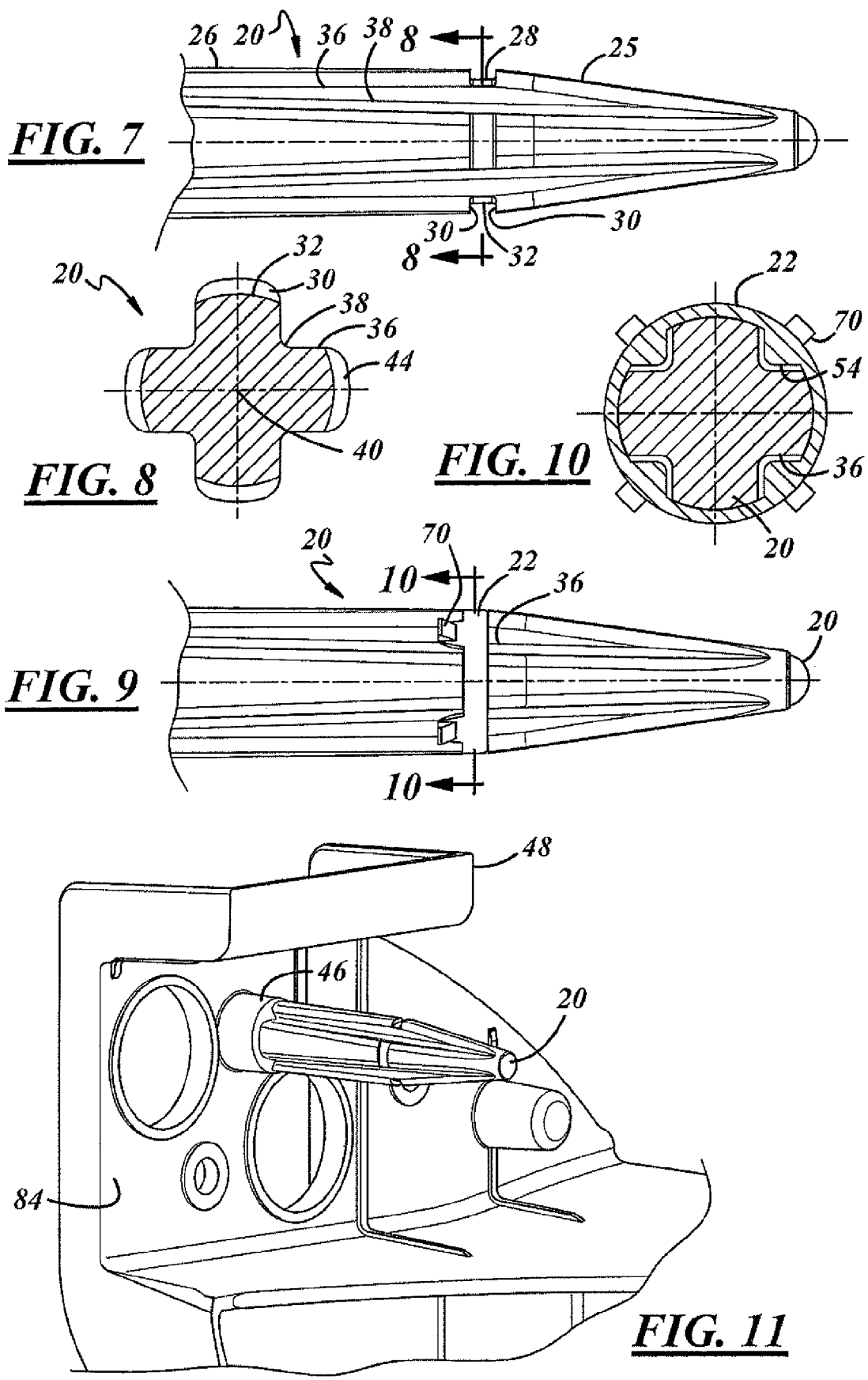

CONNECTIVE SYSTEM

FIELD OF THE INVENTION

The present invention relates to connective systems and methods for joining one body to another.

BACKGROUND OF THE INVENTION

It is common in many automotive applications that the final connection between two parts of a vehicle require a plurality of fasteners and connections. In an automotive assembly process it is often desirable to make a temporary connection of two bodies before the final fastener connections are made to accommodate certain assembly operations. An example of connecting two bodies is shown in U.S. patent application Ser. No. 11/700,424, Locator Assembly, Kapadia et al., commonly assigned, the disclosure of which is incorporated by reference herein.

SUMMARY OF THE INVENTION

To meet the above noted desire in a manner that is an alternative to those apparatus and methods revealed prior, the present invention is brought forth. The present invention provides a connective system for connecting a first body to a second body having an aperture. A pin is provided which is connected with the first body. The pin has a detent surface. A retainer ring having a snap fit engagement with the pin detent surface is included. The retainer ring has a locking arm for entry into the aperture of the second body with snap fit engagement with a surface of the second body to retain the second body with the first body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a partial enlarged view of a pin shown in FIGS. 1-4;

FIG. 8 is a view taken along lines 8-8 of FIG. 7;

FIG. 9 is a view similar to FIG. 7 illustrating installation of the retainer ring on the pin of FIG. 7;

FIG. 10 is a sectional view taken along lines 10-10 of FIG. 9; and

FIG. 11 is a partial perspective view of a front end module used in FIGS. 1-4.

DETAILED DESCRIPTION OF THE PREFERRED EMBODIMENTS

The following description of the preferred embodiment(s) is merely exemplary in nature and is in no way intended to limit the invention, its application, or uses.

Figure 1:
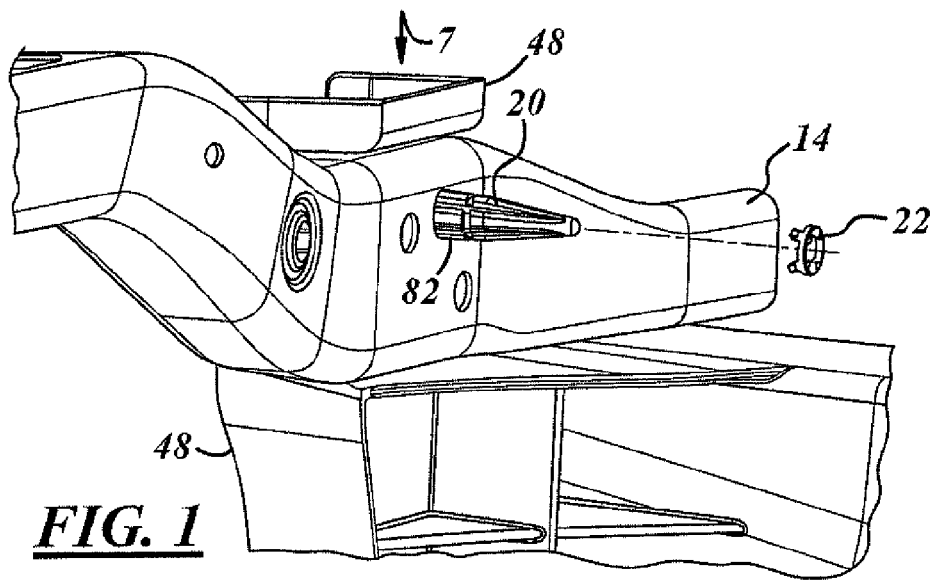
FIG. 1 is a perspective view of an embodiment of the present invention illustrating a first body with a pin which extends through an aperture of a third body.
Figure 2:
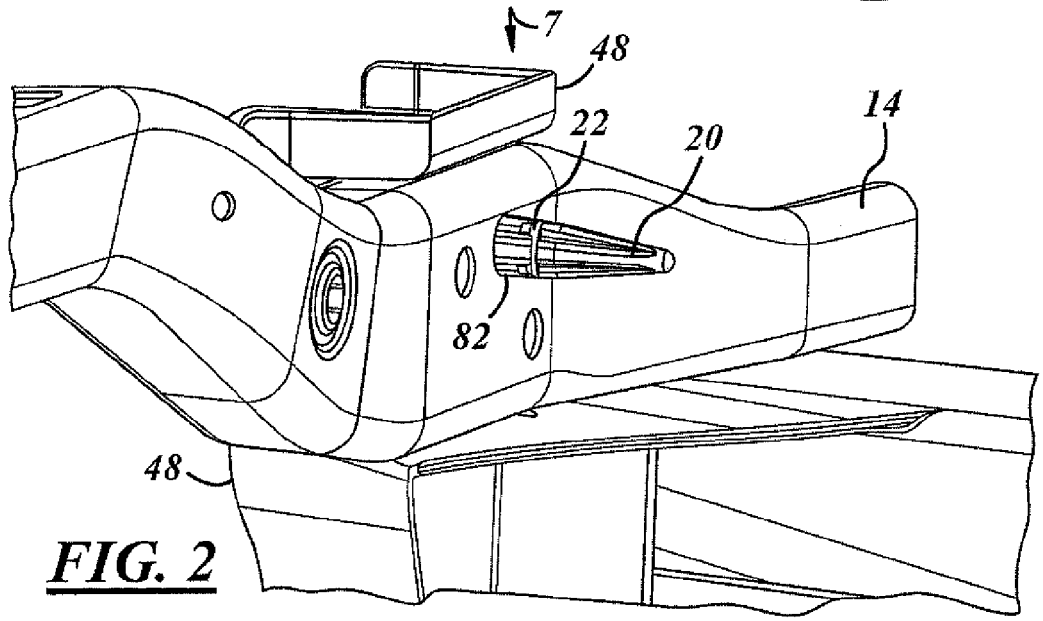
FIG. 2 is a view similar to FIG. 1 illustrating an installed retainer ring on the pin shown in FIG. 1.
Figure 5:
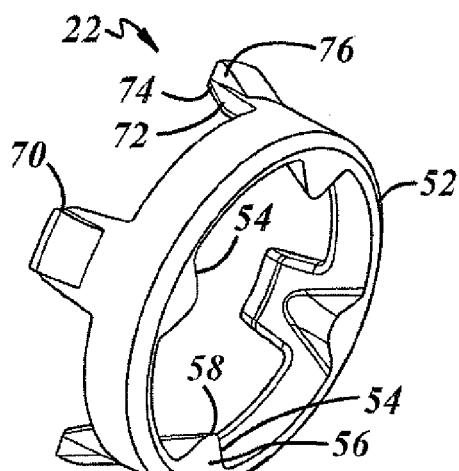
FIG. 5 is a front perspective view of the retainer ring shown in FIGS. 1-4.
Figure 6:
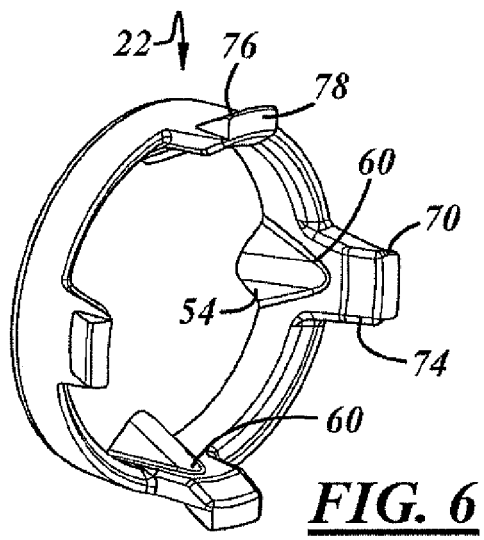
FIG. 6 is a rear perspective view of the retainer clip shown in FIGS. 1-4.
Figure 3:
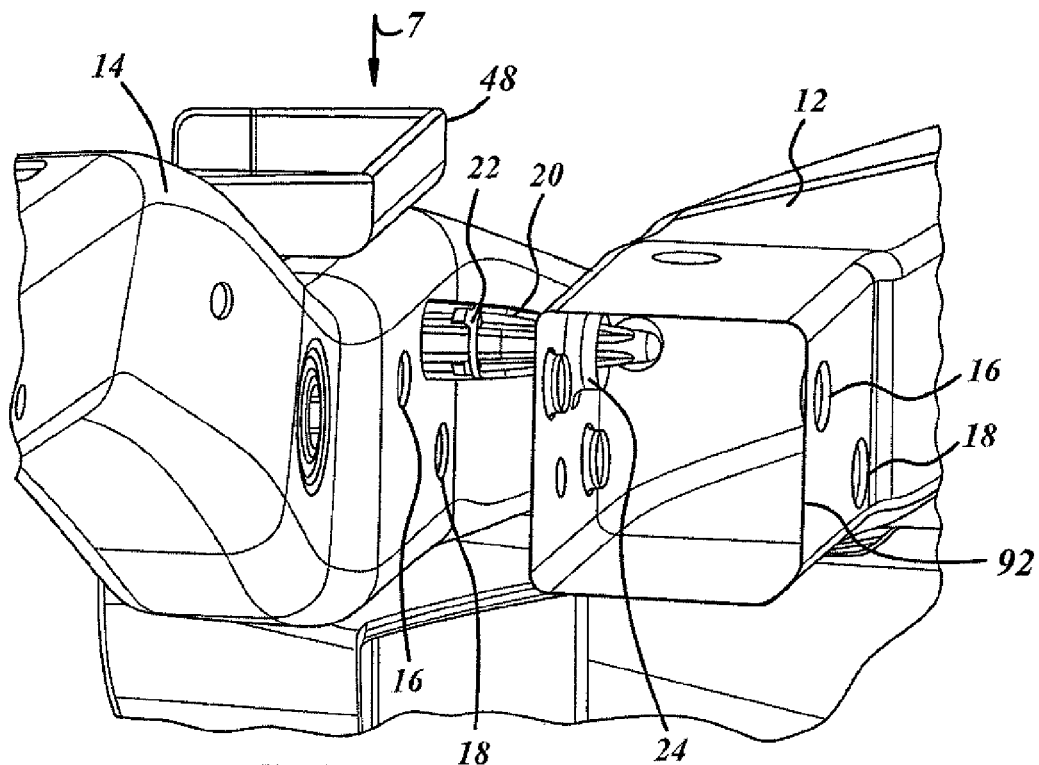
FIG. 3 is a view similar to FIG. 2 wherein the pin is being aligned and inserted into an aperture of a second body.
Figure 4:
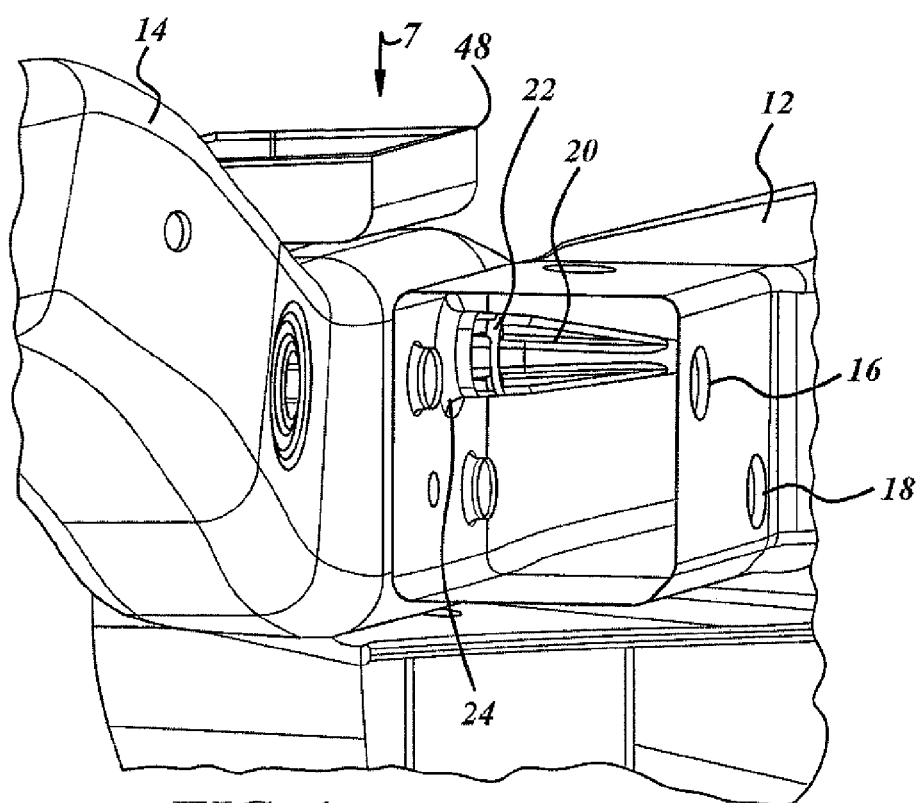
FIG. 4 is a view similar to FIG. 3 illustrating a connection of the second body with the first body with the third body being held between the first and second bodies.

Referring to FIGS. 1-11, the connective system 7 of the present invention includes a pin 20. The pin 20 has a generally conical portion 25 and a generally cylindrical portion 26. The generally cylindrical portion 26 can have a slightly enlarged diameter at its extreme end away from the conical portion 25. The pin 20 has a detent surface 28. The detent surface 28 has two generally vertical side walls 30 with a generally flat base 32. The detent surface 28 is typically located adjacent an interface between the cylindrical and conical portions 25,26. The pin 20 has a series of longitudinal flutes 36. Adjacent the interface between the conical and cylindrical portions 25,26 the flutes 36 have a base 38 that is closer to a radial center line 40 of the pin than the base 32 of the detent 28. Accordingly, the detent surface 28 is broken into four sectors 44. The pin 20 at a base portion 46 is integrally connected with a first body provided by a polymeric vehicle front end module 48.

Connected on the pin 20 with a snap fit engagement with the detent surface 28 is a polymeric retainer ring 22. The retainer ring 22 has a generally annular body 52. The annular body 52 has four geometrically spaced radially inward projecting protrusions 54. The protrusions 54 have a generally flat triangular base 56 with radial inward projecting apex 58. On an inner side, the protrusions slope radially outward to an inner radius apex 60. The apex 60 longitudinally extends beyond the annular body 52. The protrusions 54 radially align the retainer ring with the flutes 36 of the pin 20.

The apex 58 is positioned adjacent the base 38 of a flute. Accordingly, when the retainer ring 22 is a snap fit engagement with the detent surface 28, the protrusions 54 prevent the retainer ring 22 from being rotated. The base 56 of the protrusions provide a compression force interface for tooling (not shown) that installs the retainer ring 22 on the pin 20.

The retainer ring 22 has four compliant locking arms 70 radially aligned with protrusions 54. The locking arms 70 have a longitudinal base 72 which extends away from the conical portion 25 of the pin. The base 72 on an inner radial surface has an inclined portion 74. Extending radially outward from the base 72 is a locking wedge 76 having an engagement flat 78 that is mostly radially outward from the retainer ring annular body 52.

In operation the front end module 48 is positioned for assembling to a third body provided by an upper cross member 14. A lower cross member (not shown) can also be connected with the front end module 48. The module 48 has right and left side pins (only one pin 20 shown). The pins 20 are used to align the module 48 with an aperture 82 in the upper cross member 14. The pin 20 is then penetrated through the upper cross member aperture 82 causing a nest 84 of the module to wrap around the cross arm 14. The retainer ring 22 is then aligned with the pins 20 by protrusions 54 and has its annular body 52 snapped into the detent surface 28. When installed, an inner radial surface of the retainer ring body 52 can have a slight clearance with the detent surface 28. The locking arms 70 are positioned to extend away from the pin conical portion 25. The module 48 combined with the upper 14 and lower cross arms is then aligned with a second body provided by a structural member 12 (for instance an upper front body structure). The structural member 12 is hollow having a front side 90 and a rear side 92. The structural member 12 also has through apertures 16 and 18 that penetrate both sides 90 and 92. The structural member 12 also has a conically rimmed aperture 24 that is not accessible from the side 92. The conical portion 25 of the pin is penetrated into the aperture 24. The locking arms 70 are radially bent inwardly as they penetrate the aperture 24 and then spring outwardly locking on the surface of the rimmed aperture 24. The flutes 36 allow more room for the radially inward movement of the locking arms 70 as the pin penetrates the aperture 24. The upper cross arm is held between the module 48 and the vehicle structure 12. The module 48, upper 14 and lower cross arms are now connected with vehicle structure 12. The assembly operator, robot or fixture that holds the module 48 upper cross arm 14 and lower cross arms can now be released and the module 48 will not fall off from the vehicle. Later in a separate operation permanent fasteners can now connect the module 48 and the cross arms to the structure 12 by the use of fasteners passing through apertures 16 and 18 which penetrate the structural member 12 as well as a cross arm 14 and module 48.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A connective system for connecting a first body to a second body having an aperture, said system comprising:
    a pin connected with said first body, said pin having a detent surface;
    a retainer ring having a snap fit engagement with said pin detent surface, said retainer ring having a locking arm for entry into said aperture of said second body with snap fit engagement with a surface of said second body to retain said second body with said first body.

2. A connective system as described in claim 1 wherein said pin is integral with said first body.

3. A connective system as described in claim 1 wherein said pin is fabricated from a polymeric material.

4. A connective system as described in claim 1 wherein said first body is fabricated from a polymeric material.

5. A connective system as described in claim 1 wherein said second body is fabricated from a metallic material.

6. A connective system as described in claim 1 wherein said retainer ring is fabricated from a polymeric material.

7. A connective system as described in claim 1 wherein said pin has a generally conical section and a generally cylindrical section and said detent surface is adjacent an interface between said conical and cylindrical sections.

8. A connective system as described in claim 1 wherein said pin is fluted and wherein said retainer ring has a radial projection to align said retainer ring angularly on said pin.

9. A connective system as described in claim 8 wherein said locking arm is aligned with said flute and said locking arm is bent into said flute when said pin is inserted into said second body aperture.

10. A connective system as described in claim 9 wherein said flute has a base closer to a radial centerline of said pin than a base of said detent surface.

11. A connective system as described in claim 1 further including a third body and wherein said pin projects through an aperture in said third body and said third body is held between said first and second bodies.

12. A connective system as described in claim 11 wherein said second body has first and second sides and said aperture in said second body is in said first side wherein there is no access to said pin via said second side.

13. A connective system as described in claim 12 wherein said first body is a front end module and said third body is an automotive structural member and said third body is a cross arm member.

14. A connective system for connecting a first body to a second body and a third body spaced between said first and second bodies, said second body having an aperture on a first side toward said first body and said third body having an aligned aperture with said aperture in said second body, said second body having a first surface and a second surface said system comprising:
    a pin projecting through said third body and being connected with said first body, said pin having longitudinal flutes and said pin having a detent surface; and
    a retainer ring having a snap fit engagement with said pin detent surface and having radial projections aligning said retainer ring angularly with flutes of said pin, said retainer ring having compliant locking arms for entry into said aperture of said second body with snap fit engagement with a surface of said second body to retain said second body with said first body.

15. A retainer ring for connecting a first body having an extending pin with a detent surface to a second body having an aperture, said retainer ring comprising:
    an annular body for snap fit engagement with said pin detent surface; and
    locking arms connected with said annular body for insertion into said second body aperture, said locking arms having snap fit engagement with a surface of second body to retain said second body with said first body.

16. A retainer ring as described in claim 15 wherein said pin is fluted and said pin has radial projections to angularly align said retainer ring with said pin.

17. The retainer ring as described in claim 15 wherein radial projections are aligned with said locking arms.

18. A method of manufacturing a vehicle having a first body and a second body, said method comprising:
    providing an extending pin with a detent surface on said first body;
    connecting on said pin a retainer ring having a body with a snap fit engagement with said pin detent surface, said retainer ring having a locking arm; and
    penetrating said pin through an aperture of said second body and capturing said second body with said first body with said retainer ring locking arm snap fit engagement with a surface of said second body.

19. A method as described in claim 18 further including providing a third body between said first and third bodies and penetrating an aperture of said third body with said pin before connecting said retainer clip on said pin.

20. A method as described in claim 18 further including providing a flute on said pin and providing a radial projection on said retainer ring being aligned with said locking arm and angularly aligning said retainer ring with said flute of said pin with said projection and compliantly moving said locking arm into said flute when penetrating said second body aperture with said pin.

\* \* \* \* \*

UNITED STATES PATENT AND TRADEMARK OFFICE
CERTIFICATE OF CORRECTION

| | | |
|---|---|---|
| PATENT NO. | : 7,699,374 B2 | Page 1 of 1 |
| APPLICATION NO. | : 11/692251 | |
| DATED | : April 20, 2010 | |
| INVENTOR(S) | : Thomas Pilette et al. | |

It is certified that error appears in the above-identified patent and that said Letters Patent is hereby corrected as shown below:

Column 4,
Line 53, Claim 19, "between said first and third bodies" should be -- between said first and second bodies --.

Signed and Sealed this
Twenty-seventh Day of November, 2012

David J. Kappos
*Director of the United States Patent and Trademark Office*